Figure 1:
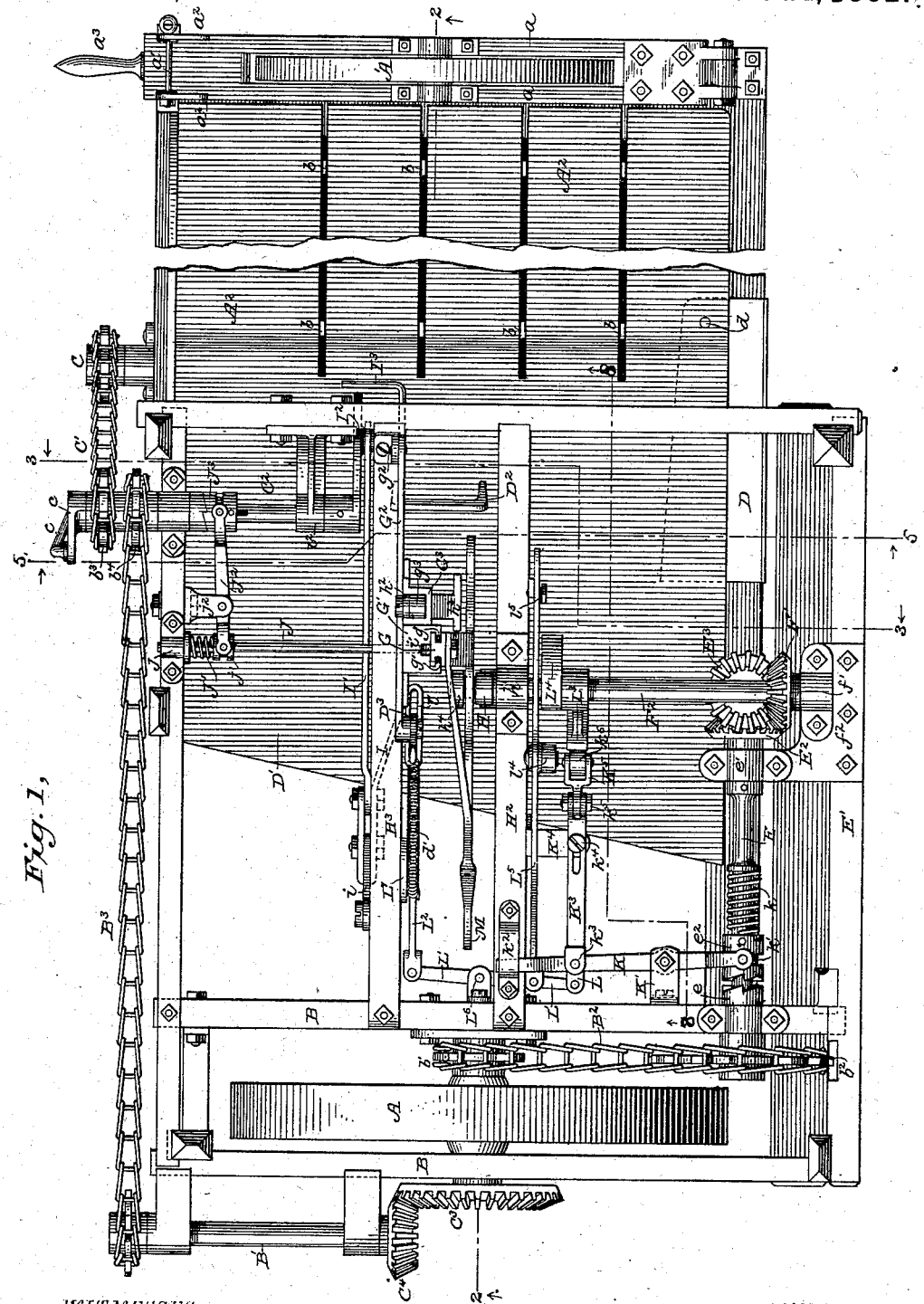

(Model.)

12 Sheets—Sheet 1.

W. LOTTRIDGE.
GRAIN BINDER.

No. 254,879.

Patented Mar. 14, 1882.

WITNESSES

Wm. A. Skinkle.
Geo. W. Breck.

By his Attorneys
Baldwin, Hopkins & Peyton.

INVENTOR
William Lottridge

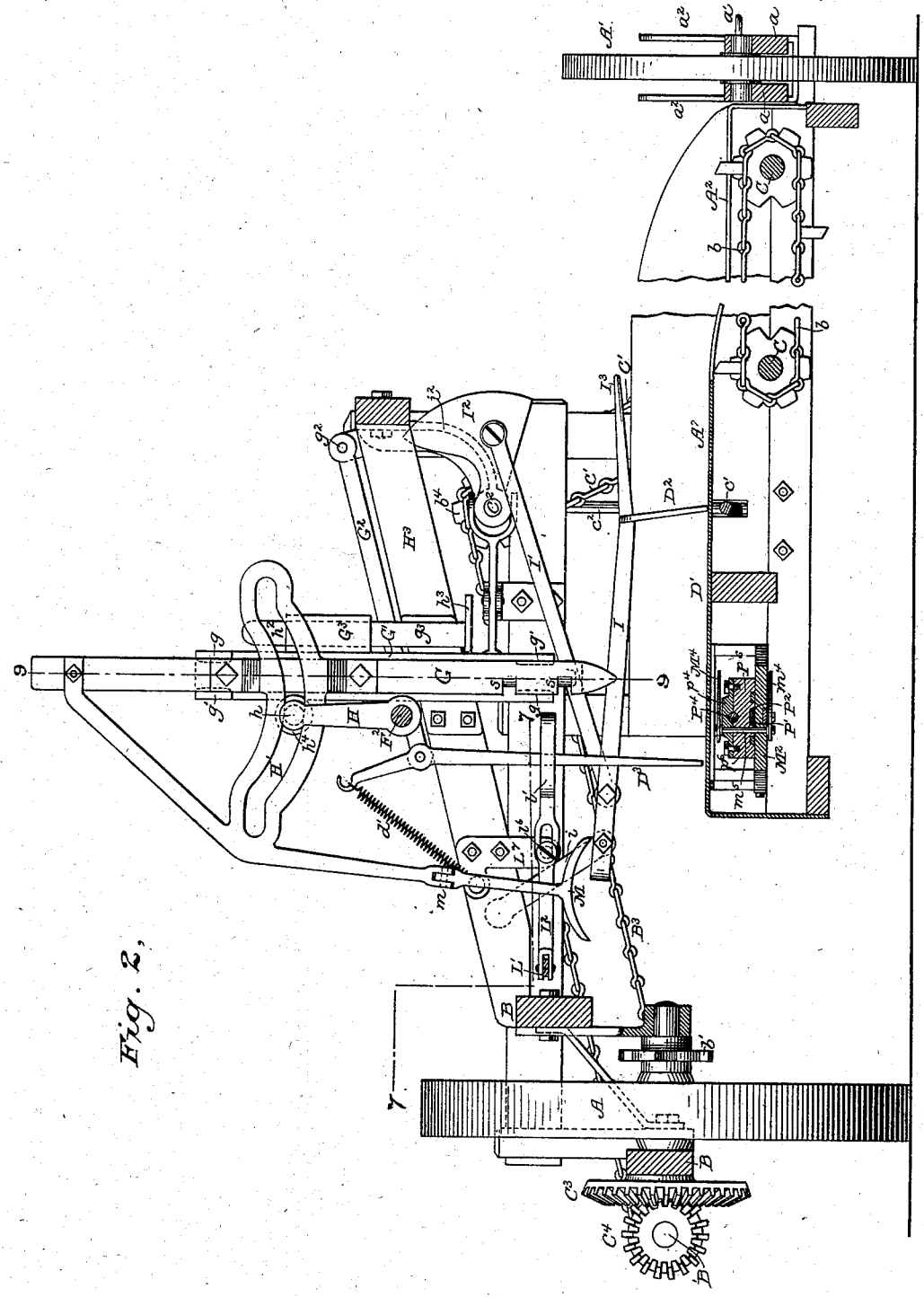

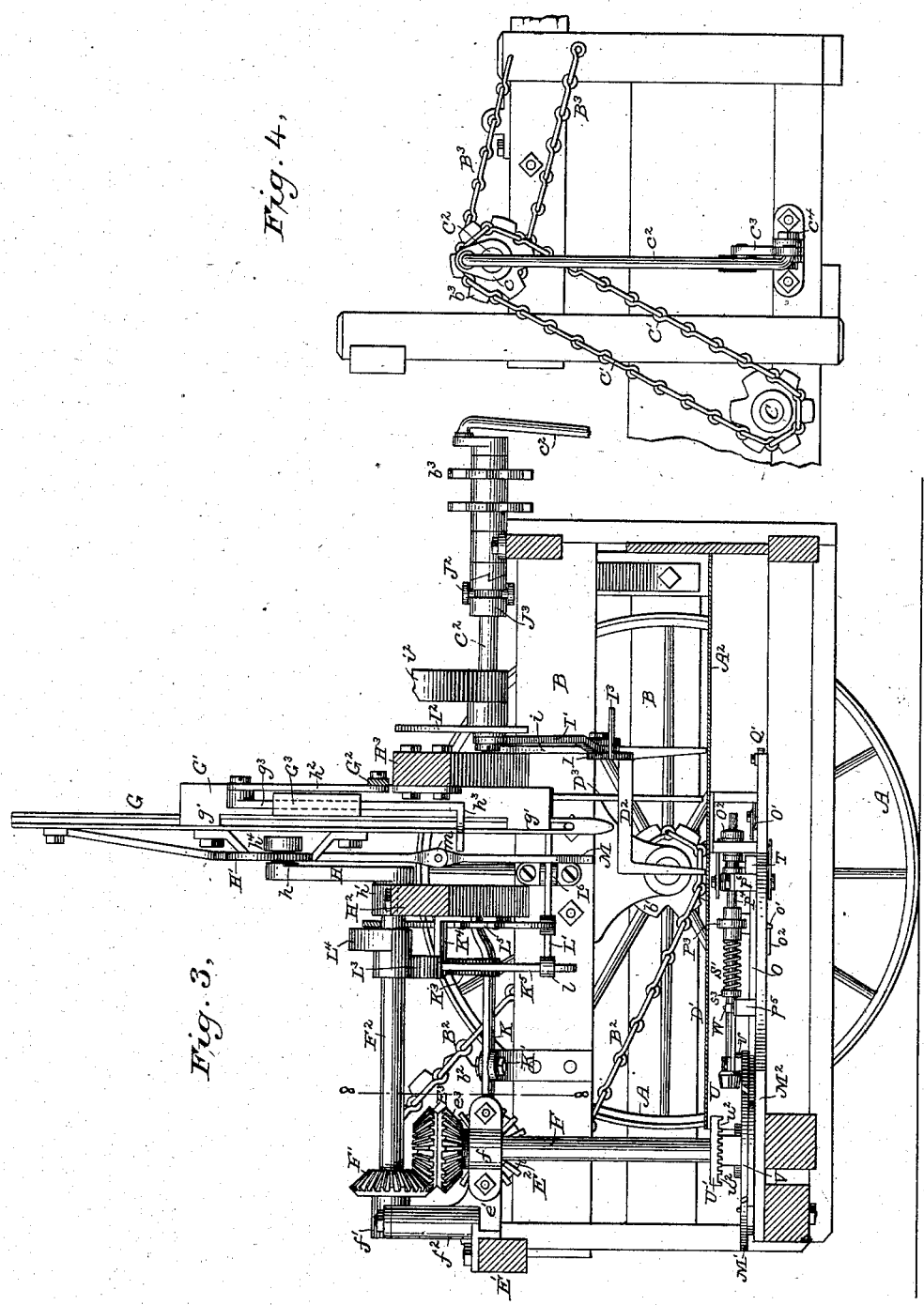

(Model.)

12 Sheets—Sheet 4.

W. LOTTRIDGE.
GRAIN BINDER.

No. 254,879.  Patented Mar. 14, 1882.

WITNESSES
Wm. A. Skinkle
Geo. W. Breck

INVENTOR
William Lottridge
by his Attorneys
Baldwin, Hopkins & Peyton.

(Model.)
W. LOTTRIDGE.
GRAIN BINDER.
No. 254,879. Patented Mar. 14, 1882.
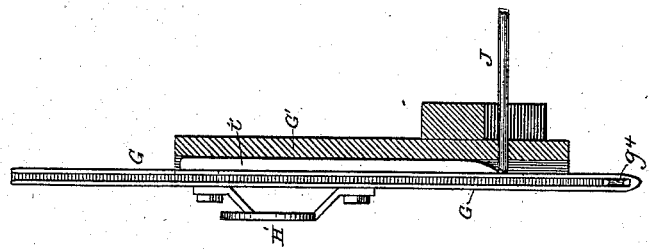
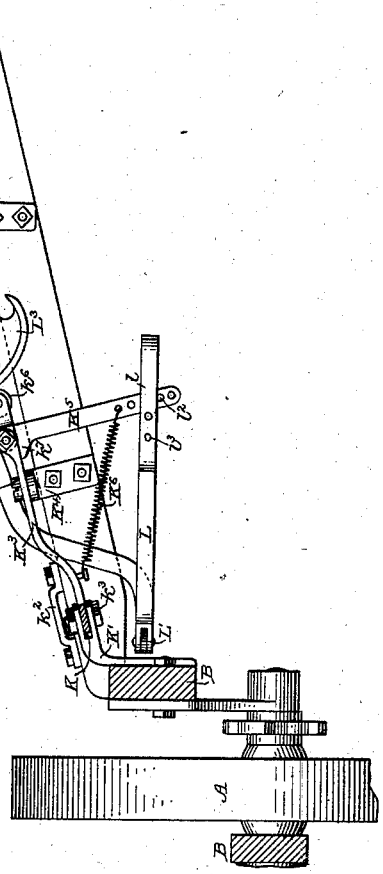
WITNESSES
Wm A Skinkle
Geo W Breck
INVENTOR
William Lottridge.
By his Attorneys
Baldwin, Hopkins & Peyton.

(Model.)

12 Sheets—Sheet 6.

W. LOTTRIDGE.
GRAIN BINDER.

No. 254,879. Patented Mar. 14, 1882.

WITNESSES
Wm. A. Skinkle
Geo. W. Breck

INVENTOR
William Lottridge.
By his Attorneys
Baldwin, Hopkins & Peyton (Model.)

12 Sheets—Sheet 7.

W. LOTTRIDGE.
GRAIN BINDER.

No. 254,879. Patented Mar. 14, 1882.

WITNESSES
Wm A. Skinkle
Geo W. Beck

INVENTOR
William Lottridge
By his Attorneys
Baldwin, Hopkins & Peyton (Model.)

W. LOTTRIDGE.
GRAIN BINDER.

No. 254,879. Patented Mar. 14, 1882.

WITNESSES.
Wm. A. Skinkle
Geo. W. Buck

INVENTOR.
William Lottridge
By his Attorneys
Baldwin, Hopkins & Peyton (Model.)

12 Sheets—Sheet 9.

W. LOTTRIDGE.
GRAIN BINDER.

No. 254,879. Patented Mar. 14, 1882.

WITNESSES
Wm A. Skinkle
Geo. W. Breck

INVENTOR,
William Lottridge,
by his Attorneys
Baldwin, Hopkins & Peyton.

(Model.)

12 Sheets—Sheet 10.

W. LOTTRIDGE.
GRAIN BINDER.

No. 254,879.  Patented Mar. 14, 1882.

WITNESSES
Wm. A. Skinkle
Geo. W. Breck

INVENTOR
William Lottridge
By his Attorneys
Baldwin, Hopkins & Payton.

(Model.)
W. LOTTRIDGE.
GRAIN BINDER.
No. 254,879.
Patented Mar. 14, 1882.
12 Sheets—Sheet 11.
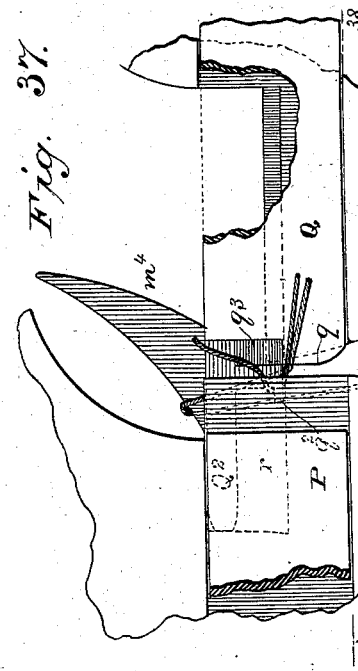
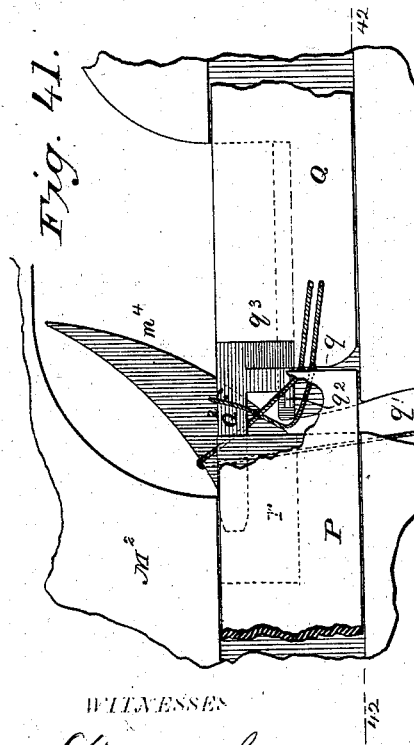
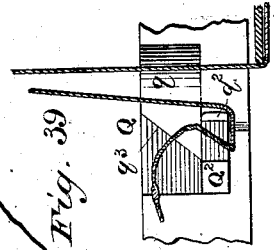
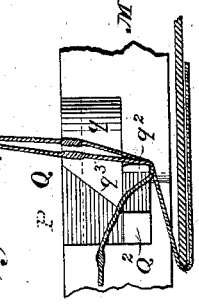
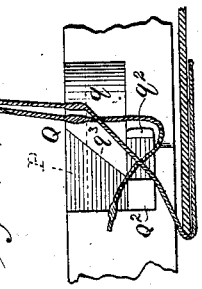
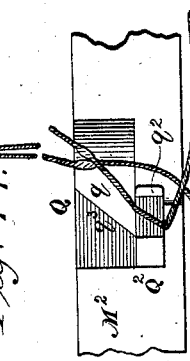
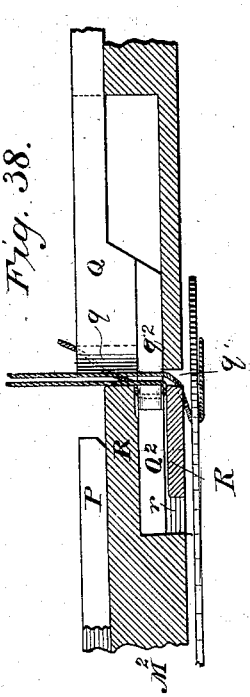
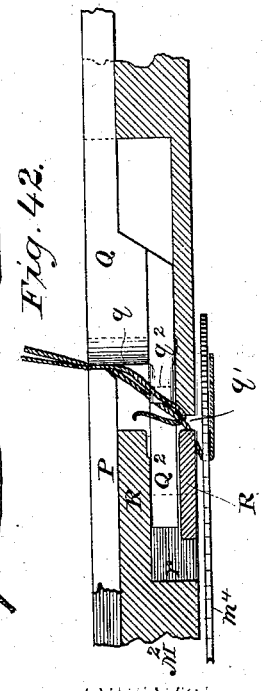
WITNESSES
Wm A. Skinkle
Geo N. Breck.
INVENTOR
William Lottridge
By his Attorneys
Baldwin, Hopkins & Peyton.

(Model.)
12 Sheets—Sheet 12.
W. LOTTRIDGE.
GRAIN BINDER.
No. 254,879.
Patented Mar. 14, 1882.
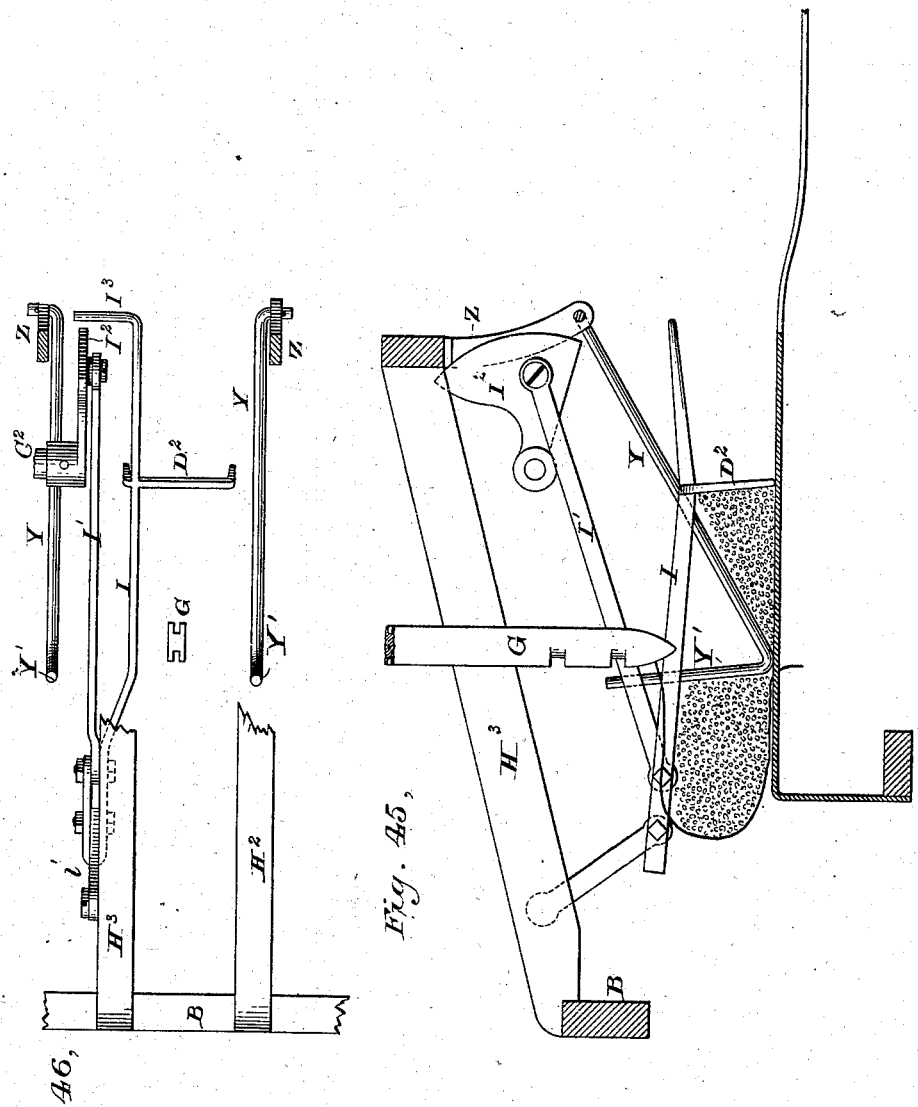
WITNESSES
Wm. A. Skinkly.
Geo W. Breck
INVENTOR.
William Lottridge,
By his Attorneys.
Baldwin, Hopkins & Peyton.

UNITED STATES PATENT OFFICE.

WILLIAM LOTTRIDGE, OF OSAGE, IOWA, ASSIGNOR OF EIGHT-EIGHTEENTHS TO MARTIN V. NICHOLS AND FOUR-EIGHTEENTHS TO CYRUS H. COTTER, BOTH OF SAME PLACE.

GRAIN-BINDER.

SPECIFICATION forming part of Letters Patent No. 254,879, dated March 14, 1882.

Application filed May 28, 1881. (Model.)

*To all whom it may concern:*

Be it known that I, WILLIAM LOTTRIDGE, of Osage, in the county of Mitchell and State of Iowa, have invented certain new and useful Improvements in Grain-Binders, of which the following is a specification.

My invention mainly relates to improvements in automatic binders of the class in which cord is employed to secure the bundles of grain, and in which the grain is bound at or upon the inner end of the grain-platform, or an extension thereof, on or substantially in the same level as the platform. Some of my improvements, especially the cord manipulating or tying mechanism, are, however, applicable to machines of various types.

My improvements consist in a novel organization of mechanism, and in certain combinations of devices, which hereinafter first are fully described, and then specifically designated by the claims.

In the accompanying drawings, which represent so much of a harvester as is deemed necessary to illustrate my invention, I have shown all my improvements embodied in the best way now known to me. Some of them may, however, be used without the others, as by ingrafting essential features of my invention upon machines differing in some respects from the one in this instance shown and hereinafter particularly described, and which resembles somewhat that in connection with which are shown certain improvements heretofore invented by me, and patented December 17, 1878, No. 211,027.

Figure 5:
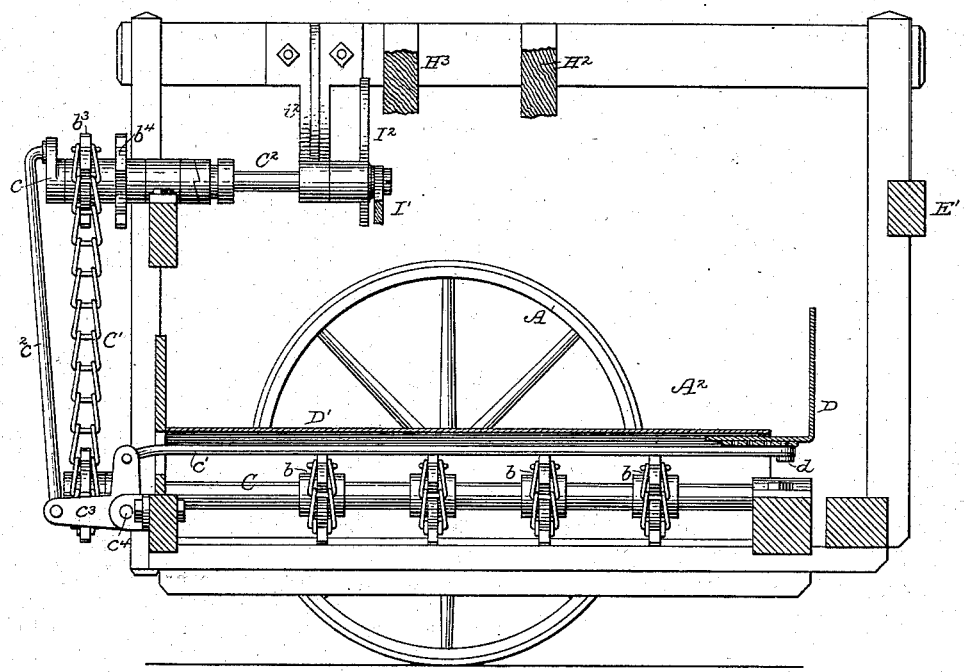
Figure 6:
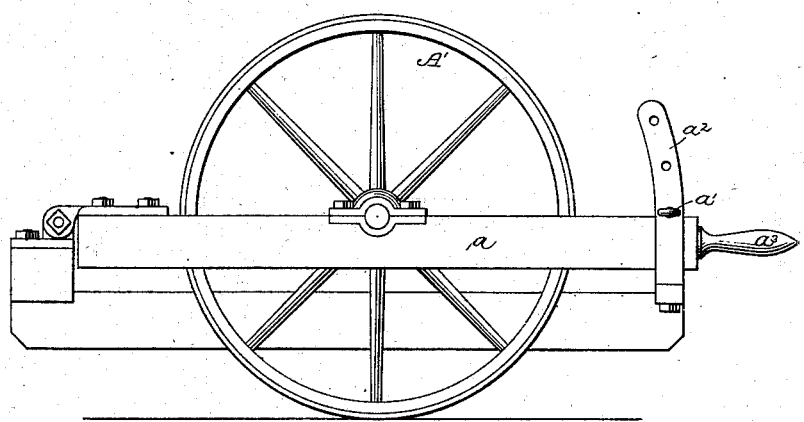
Figure 10:
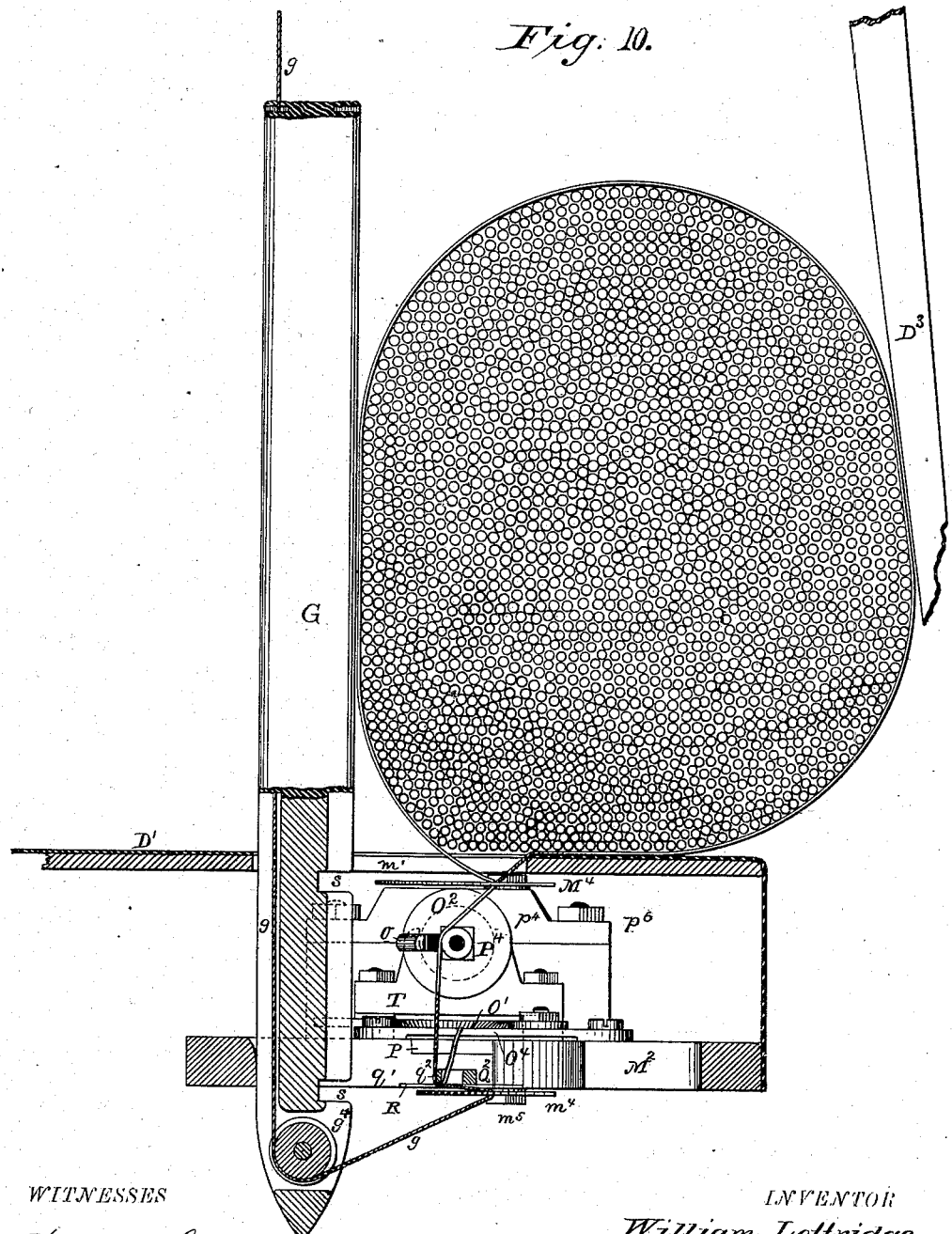
Figure 11:
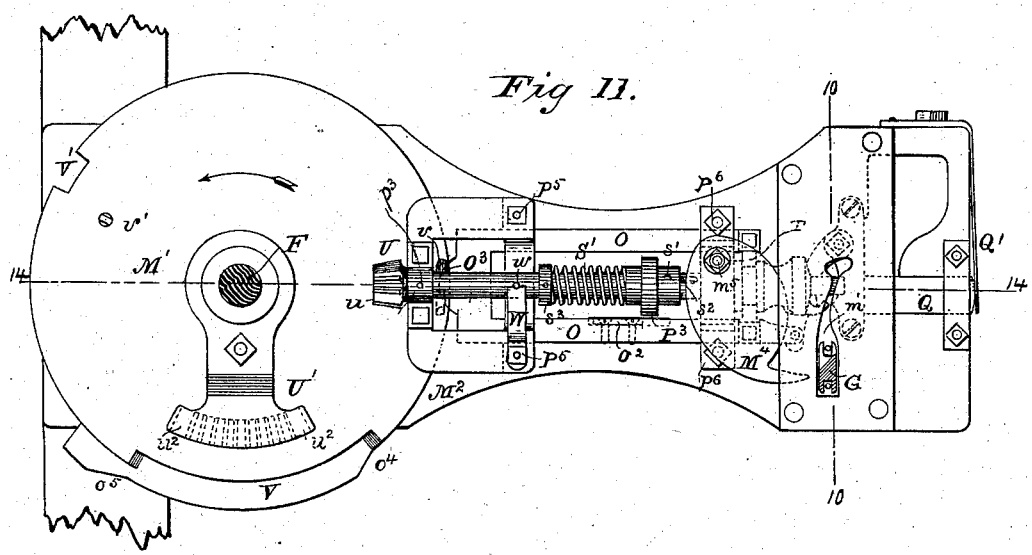
Figure 12:
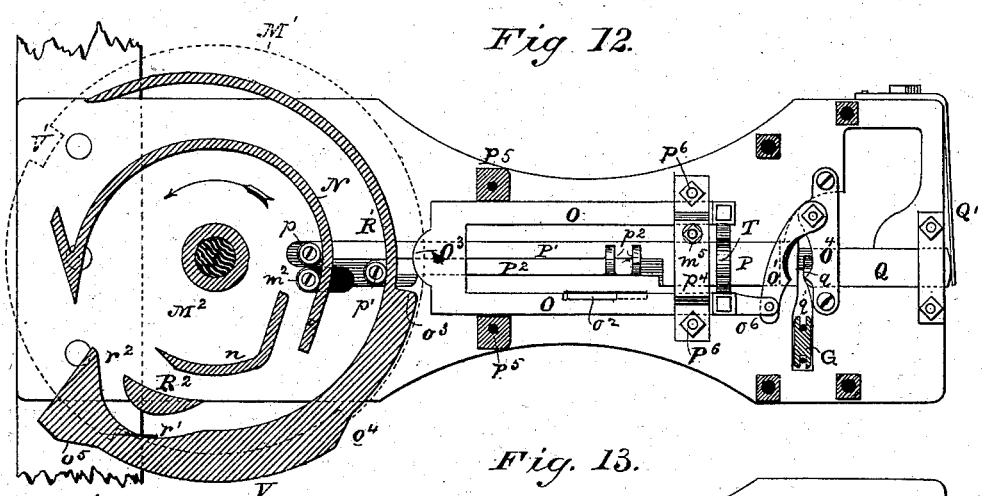
Figure 13:
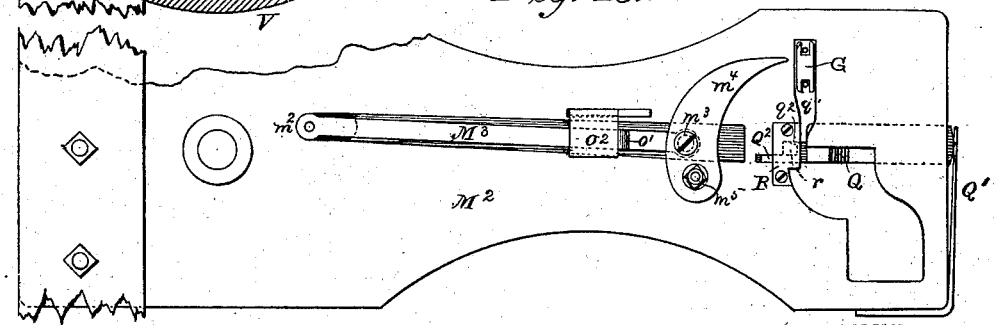
Figure 14:
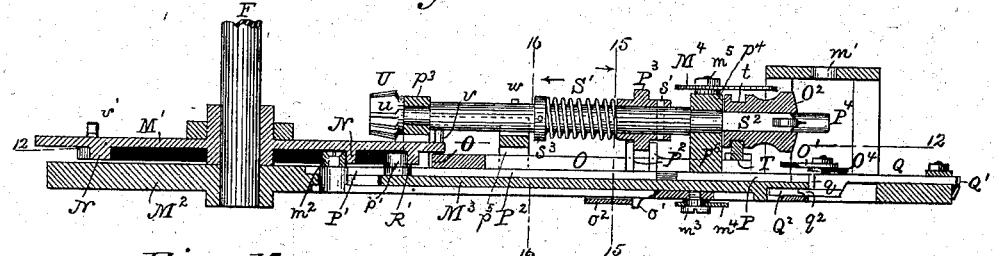
Figure 15:
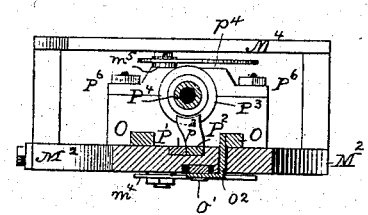
Figure 16:
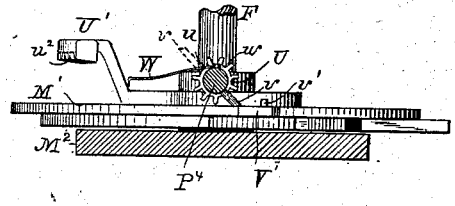
Figure 17:
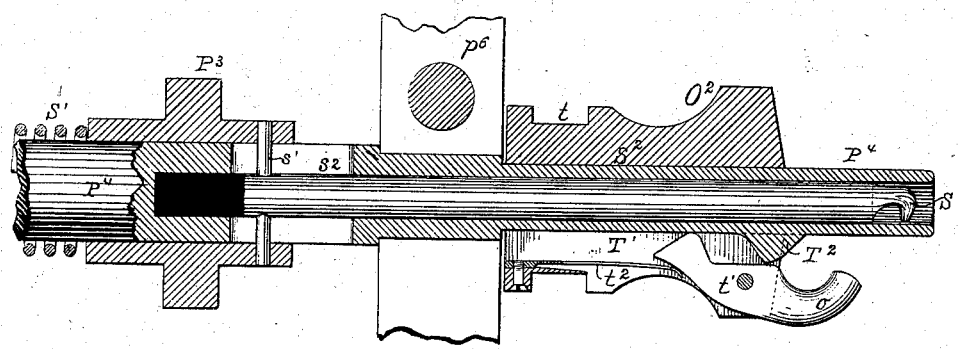
Figure 18:
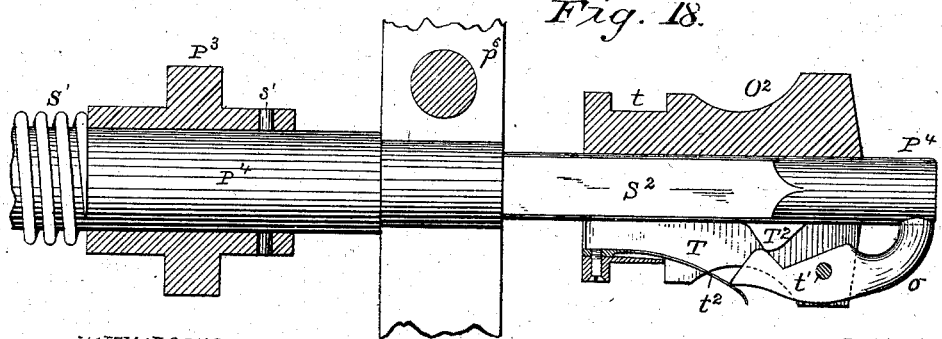
Figure 35:
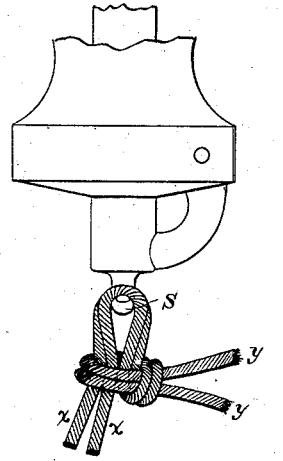
Figure 36:
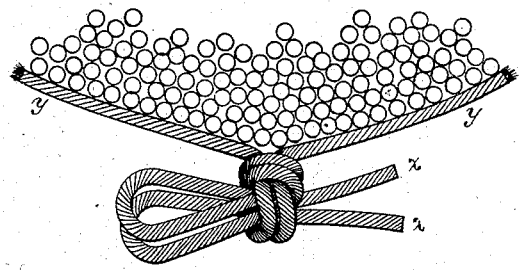

Figure 1 is a plan or top view of the machine with the platform partly broken away. Fig. 2 is a view partly in front elevation and partly in vertical section, as indicated by the line 2 2 of Fig. 1. Fig. 3 is a view partly in side elevation and partly in vertical section, as indicated by the line 3 3 of Fig. 1, looking from the inner or platform side of the machine. Fig. 4 is a view in detail, showing a rear elevation of the inner back corner of the main frame and the adjacent portion of the platform, and in part the devices for evening the butts of the grain as it is being delivered to the point where it is bound. Fig. 5 is a view partly in side elevation and partly in section on the line 5 5 of Fig. 1, looking from the outer or drive-wheel side of the machine. Fig. 6 is a view in elevation of the grain-wheel end of the platform. Fig. 7 is a view partly in plan and partly in horizontal section, as in part indicated by the line 7 7 of Fig. 2, showing details of the binding mechanism, starting devices, and features of the bundling or gavel-compressing devices. Fig. 8 is a view partly in front elevation and partly in section, as indicated by the lines 8 8 of Figs. 1 and 3, showing details of the binding mechanism, stopping and starting devices. Fig. 9 is a view partly in side elevation and partly in section on the line 9 9 of Fig. 2, showing the reciprocating cord-carrying needle or binder-arm, and in part the devices by which the movements of this arm are caused to stop and start the gavel-gatherer or grain-compressor rake. Fig. 10 is a view partly in rear elevation and partly in section on the line 10 10 of Fig. 11, showing parts of the bundling and tying mechanism, with a gavel represented as encompassed by the cord, and the parts in the positions occupied just after the band ends have passed to or been engaged by the tyer or knotting devices. Fig. 11 is a plan of the tyer or band controlling and knotting mechanism, with the actuating-shaft and needle binder-arm in section; Fig. 12, a view of said cord controlling and knotting mechanism, partly in plan and partly in section in the planes indicated by the line 12 12 of Fig. 14; Fig. 13, a bottom view of the cord controlling and knotting mechanism; Fig. 14, a view partly in elevation and partly in section on the line 14 14 of Fig. 11; Fig. 15, a transverse section on the line 15 15 of Fig. 14; Fig. 16, a transverse section on the line 16 16 of Fig. 14. Fig. 17 is a longitudinal view, partly in section, of the two rotating and independently-reciprocating cord-engaging hooks of the knotting mechanism and their immediate attachments or connections, the rotating tubular shank or mandrel (about which the cord is looped, within which the inner hook reciprocates, and on which the carrier of the outer hook is supported) being shown in section and the parts represented as in their inoperative position, or ready to have the cord passed around the mandrel; Fig. 18, a view generally similar to Fig. 17, the outer hook being shown as advanced upon the rotating mandrel or supporting tubular shank into the position assumed by it just after the ends of the band or cord have been passed to or pressed against the mandrel. Figs. 19 to 35, inclusive, are diagrams representing the various positions of the cord-engaging hooks of the knotter and the positions assumed by the band ends in the different stages of the knotting operation. Fig. 36 is a view representing a portion of a band about a bundle, with the knot completed. Fig. 37 is a plan view with parts broken away, showing details of the cord placing and griping or holding devices beneath the plane of the cord-engaging hooks, with the needle binder-arm in section, the parts being represented as in the positions assumed shortly after beginning to engage and act upon the band in securing it about a bundle; Fig. 38, a vertical section on the line 38 38 of Fig. 37, with parts shown in elevation; Fig. 39, a view in elevation of the inner end of the outer member of the griper or cord-holding slide and its immediate connections, the lower cord-controller or placing-finger being in part represented in section and shown as in a position occupied by it at a stage in the operation prior to that illustrated by the two preceding figures; Fig. 40, a view generally similar to that represented by Fig. 39, but with the parts in position assumed at a later stage in the tying operation; Fig. 41, a plan view generally similar to that represented by Fig. 37, but with the parts in different positions, the main member or inner slide of the griper being advanced and the outer slide retracted, and both ends of the band griped side by side between the adjacent surfaces of the ends of the two slides, that end of the band before held beneath the main griper-slide being released at such place; Fig. 42, a section on the line 42 42 of Fig. 41. Figs. 43 and 44 are views generally similar to those represented by Figs. 39 and 40 at stages in the operation prior to and just after severing the band, Fig. 44 showing the end of the cord as clamped beneath the main member or inner slide of the griper, ready for securing another bundle. Figs. 45 and 46 are views in side elevation and plan, with parts in section, showing guards or holders to prevent scattering or spreading of the grain accumulated to form a gavel.

The machine is carried upon a main supporting and driving wheel, A, and a vertically-adjustable platform-supporting or grain wheel, A', which is journaled between connected bars $a\ a$, or in a slot in a single bar hinged at front to the outer end of the finger-beam or adjacent portion of the platform $A^2$, so as to vibrate vertically, and adjustably secured at rear by means of a pin, $a'$, in holes in curved standards $a^2\ a^2$, secured to the rear outer corner of the platform. A handle, $a^3$, admits of the ready raising and lowering of the levers or bar $a\ a$ in adjusting the grain-wheel to the desired height. The driving-wheel is secured fast upon its axle, which is suitably mounted in the main frame beams or transverse bars B B. The driving-wheel imparts motion to toothed endless chains $b$, of any desired number, working in slots in the platform. The shaft B', geared with the axle of the driving-wheel, is provided with a sprocket-wheel, around which passes a chain, $B^3$, to communicate the motion to the toothed endless chains in the manner and by means farther on fully to be explained. The driving-wheel also imparts motion to the binding mechanism through or by way of a sprocket-wheel, $b'$, on the main axle and a chain, $B^2$, passing over a sprocket-wheel, $b^2$, in manner hereinafter fully to be described.

The above-mentioned features to the extent described, excepting the way of mounting the grain-wheel, are generally similar to or substantially the same as corresponding parts in the machine shown in the before-referred-to Patent No. 211,027.

Instead of two series of toothed endless chains working in the platform-slots, as in the above-mentioned patent, I in this instance employ but a single series of the chains $b$, mounted on the shafts C C, the inner one of which shafts is driven by a chain, C', from a sprocket-pulley, $b^3$, loose on a shaft, $C^2$, which pulley is in turn driven by the chain $B^3$, which passes around a pulley, $b^4$, fast to the pulley $b^3$, as well as around a pulley on the rear end of the shaft B', operated from the driving-wheel by the bevel-gears $C^3\ C^4$, respectively on the outer end of the main axle and on the inner or front end of said shaft. The shafts B' and $C^2$ are mounted respectively at the outer rear corner and near the inner rear corner of the frame of the machine.

A positively-actuated horizontally-vibrating gavel regulator or evener, D, to adjust the grain as it is delivered to the inner end of the platform on the way to be bound, is shown (see Figs. 1 and 5) as formed of a bent or angular plate, pivoted by its base at $d$, near its outer end and inner edge, so that as vibrated the vertical part of the evener will repeatedly strike or pat the butts of the grain and even the stalks. This regulator or stalk-evener is in this instance vibrated by means of a crank, $c$, fast to the pulley $b^3$ on the rotating shaft $C^2$, a connecting-rod or pitman, $c'$, a link or rod, $c^2$, and a bell-crank or elbow lever, $c^3$. (See Figs. 1, 2, 4, and 5.) The link $c^2$ connects the crank of the shaft $C^2$ with one arm of the bell-crank lever, so as to rock this lever on its pivot $c^4$, while the opposite arm of the lever is pivoted to the rear end of the pitman $c'$, which at front is pivoted to the evener D, by preference to the under side of the base or horizontal portion thereof. The pitman may, if preferred, be extended and bent upward in front of the evener, and adjustably secured thereto by a set-screw and horizontal slot in the upright portion of the evener. By adjustably connecting the pitman with this evener, preferably by a screw, $d$, to fit any one of a series of holes in the base of the evener, (see Fig. 5,) the evener may be adjusted to suit variations in the length of grain, and this without interfering with the proper delivery of the grain as carried inward by the delivery belts or chains and a rake or gavel-gatherer, D², so as to bring the butts inside of the upright portion of the evener for acting on the projecting stalks of a bundle as the grain is accumulated upon the binding-table or inner grain-receptacle portion, D', of the platform.

The rake or gatherer D² and a grain-arrester or gavel-sizing stop-arm, D³, (between which arrester and gatherer the gavel is accumulated, compressed, and its size regulated upon the binding-table;) are operated in the manner and by the means hereinafter to be explained.

The before-mentioned driven sprocket-wheel $b^2$ for operating the tying devices of the binding mechanism is mounted loosely on the end of a shaft, E, housed in a bearing at the front of the inner bar of the pair of frame-bars B B. The hub or sleeve of the pulley inside said bearing has fixed to it a clutch-collar or member, $e$, of an ordinary clutch-coupling. Near its inner end—the end opposite that to which the chain-wheel $b^2$ is fixed—the shaft E is mounted in a bearing, $e'$, secured to and projecting backward from the front top frame-bar, E', and at its inner end this shaft carries a bevel-pinion, E². This bevel-pinion is caused to rotate when the movable clutch-section or sliding member $e^2$ of the clutch-coupling is engaged, in manner to be described farther on, with the member of the clutch carried by the pulley $b^2$. The pinion E² meshes with the lower one, $e^3$, of a pair of fixedly-connected bevel-pinions, E³ $e^3$, on the upper end of a tyer-actuating shaft, F. The upper one, E³, of the pair of pinions meshes with a corresponding pinion, F', on a shaft, F², for actuating a vertically-reciprocating cord-carrying needle or binder-arm, G. The shafts F and F² are mounted at their adjacent ends respectively in bearings $f$ and $f'$ on a bracket, $f^2$, secured to the frame-bar E', and to which bracket the bearing $e'$ of the shaft E is also secured.

The vertically-reciprocating needle or binder-arm G is actuated by a crank, H, on the inner end of the revolving shaft F², a pin or roller, $h$, on the crank working in an irregular slot or camway, H', in a plate fixed to the side of the binder-arm. The cord $g$ passes along the binder-arm by a suitable channel or groove running lengthwise thereof, and the binder-arm is supported by a standard or upright, G', and suitable engaging-clips or guide-lugs, $g'$, in any desired number. A roller, $g^4$, is provided near the point of the binder-arm for the cord to pass around, as usual. The binder-arm support G' and the inner bearing, $h'$, for the actuating-shaft F² are secured respectively upon inclined frame-bars H² H³, between which the binder-arm reciprocates.

The before-mentioned grain-arrester arm D³ is pivoted near its upper end to the outer or free end of a vibrating arm, G², which is pivoted at $g^2$ by its inner or heel end to the frame-bar H³. This vertically-vibrating arm G² passes along one side of the supporting-standard G', and is connected by a link, $h^2$, with the upper end of a vertically-reciprocating bar, $g^3$, supported and guided in a bracket, G³, secured to the binder-arm support G'. At the lower end of this bar $g^3$ there is a lateral projection or stud, $h^3$, beneath which passes a disk or roller, $h^4$, on the roller or pin $h$ of the crank H, inside of the camway H', so as to elevate the bar, and with it the grain-arrester arm D³, when the crank is ascending from its lowermost position, at which time the binder-arm is also ascending, and in this way free a bound bundle, as will farther on more clearly appear. A spring, $d'$, connected with the upper end of the arrester-arm, acts with a constant tendency to swing the arrester-arm against the pressure of the grain being accumulated and compressed, or to hold said arm in the position normally occupied by it, as when no grain is upon the binding table.

The before-mentioned intermittently-actuated gavel-gatherer or rake D², for repeatedly acting on the grain as collected by the endless belts of the platform, is thrown into and out of operation automatically, as will now be described, referring to Figs. 1, 2, 3, and 7 of the drawings.

The rake-head or gatherer proper (which may consist of two or more teeth) is secured to the outer end of an elongating and contracting or jointed shank or handle, I, which at its inner or heel end is in this instance pivoted to a swinging pendent arm or vibrating link, $i$, shown as supported by the frame-bar H³. A jointed controller-arm or link-rod, I', is connected at one end by a pivot with the rake-shank I, and at the other end this link is pivoted to a crank-arm or cam-plate, I², fastened on the inner end of the shaft C², which is supported near its cam or crank plate in a bearing in a bracket, $i^2$. Ordinarily, or in its normal or operative condition, the shaft C² is caused to revolve with its pulleys $b^3$ $b^4$, by means of a clutch-coupling connecting the sleeve or hub of the pulleys with the shaft. As the shaft revolves the rake is drawn outward and moved backward by the link I', and the rake-head is lifted on the outward stroke and held above the grain by the action of the cam-shaped crank or plate I² on a bent guide or lifter arm, I³. As the crank-plate is revolved and the rake drawn out over the platform and the grain thereon, the rake-head is elevated by the cam, and by the time the rake has reached the limit of its outward movement its arm I³ is freed by the cam and the rake-teeth drop upon the platform, after which, by the thrust of the link I', the rake moves inward, gathering the grain upon the binding-table. The continued movement of the shaft C² causes the cam to again elevate the rake and move it outward to draw in more grain, and so on until sufficient grain to form a gavel is accumulated. The rake is thrown out of operation at the proper time, so as to prevent interference with the bundling mechanism, by an incline, $i'$, on the binder-arm striking against the outer end of an endwise-moving clutch-actuating rod, J, which rod passes at one end through an opening in the binder-arm support or standard G', and is mounted at its opposite end in a support, $j$, on the frame of the machine. A spring, J', acts with a tendency to hold this rod in its normal position or to move it in a direction opposite that in which it is moved by the incline $i'$ on the binder-arm G. (See Fig. 1.) An annularly-grooved collar, $j'$, fast on the clutch-controlling rod J, is engaged by the forked end of a lever, J², which is pivoted to a lug, $j^2$, and engages the sliding member J³ of an ordinary clutch-coupling on the shaft C².

The operation of the devices for throwing the gavel-gatherer into and out of operation will readily be understood without further explanation.

Automatically-acting mechanism is provided for throwing the tying apparatus of the binding mechanism into and out of operation. (See Figs. 1, 2, 3, 7, and 8.) This automatic tyer-actuating mechanism is connected with mechanism operated upon by the arrester or bundle stop-arm D³.

The before-mentioned movable or sliding section $e^2$ of a clutch-coupling of well-known form on the shaft E, carrying the chain-wheel $b^2$, is acted upon by the spring $k$, the tendency of which is to slide the clutch-section $e^2$ into engagement with the section $e$ and to hold it in place when so engaged. The forked end $k'$ of a horizontally-vibrating clutch shifter or lever, K, engages an annular groove in the sliding section $e^2$ of the clutch-coupling. This shifter-lever is pivoted to a lug, K', on one of the frame-bars B, near its forked end, and its opposite or heel end is supported and guided in a suitable slot or way, shown as formed by a bracket, $k^2$, on the frame-bar H².

A link-arm or flat bar, K³, is pivoted at $k^3$ by one end to the shifter-lever K, and is held against vertical play and guided in its endwise movements as the lever vibrates by means of a slot and a screw, $k^4$, passing through this slot and into a fixed supporting-lug, K⁴, attached to the frame-bar H². This slotted link K³ carries at its outer end a vertically-vibrating cranked arm or elbow-lever, K⁵, jointed by a pivot, $k^5$, at its bevel or angle in a fork or slot in the link end. The downwardly-projecting longer arm of this lever engages a loop or slot, $l$, in the outer end of a link, L, which link, at its inner or heel end, is pivoted to the front end of a horizontally-vibrating arm, L', which is in turn pivoted at its opposite end to the inner end of an endwise-moving arm or link, L², having a loop or slot, $l'$, at its outer end, in which the vibrating bundle-arrester and sizing-arm D³ works. The upper and shorter arm of the lever K⁵ projects toward the binder-arm actuating-shaft F², and carries a roller, $k^6$, at its end. A spring, K⁶, connects the longer or downhanging arm of the elbow-lever with its carrying-link K³, near its pivot, and this spring acts constantly with a tendency to hold the longer arm rocked inward and its shorter roller-supporting arm rocked downward to the extent of the movement allowed the elbow-lever by its connection with the slot $l$ of the link-bar L. A properly-adjusted connection between this slotted link and the arm of the elbow-lever is made by pins $l^2$ $l^3$, fitted in holes in the lever and in the link-bar, as clearly shown in Fig. 8. A wiper or cam-projection, L³, on the shaft F² operates in connection with the roller of the elbow-lever K⁵, and another cam, L⁴, on this shaft acts upon a stud or roller, $l^4$, on the side of a thrust-arm, L⁵, pivoted at its heel to the arm L', which is connected with the arrester D³. This thrusting-arm L⁵, at its outer end, passes over and rests upon the binder-arm actuating-shaft F², and is maintained in proper position during its reciprocations in suitable way, as by means of a longitudinal slot and a screw, $l^5$, secured to the frame-bar H² and passing through this slot. The horizontally-vibrating arm L' is pivoted to a bracket, L⁶, on the frame intermediate its connections with the link L² and arm L⁵, and the link L², in operating with the arrester D³, is guided in its reciprocations by a longitudinal slot and a screw, $l^6$, passing through the slot and secured in a bracket, L⁷, which bracket serves also to secure one end of the before-mentioned arrester-arm spring $d'$. (See Figs. 1 and 2.)

From the above description it will be understood that on the accumulation upon the receptacle or table D' and against the bundle sizing and arresting arm D³ of a sufficient amount of grain by the operation of the gathering-rake D² the arrester will be vibrated and moved back or against the strain of its spring $d'$ until it strikes against the inner end of the loop or guide-slot $l'$ of the endwise-moving link L². When the grain pushes against the arrester with sufficient force to vibrate the arm L', to which this pushing force is transferred, the movement of this arm, being imparted to the shifter-lever K by way of the link-bar L $l$ and the reciprocating link-arm K³, will throw the clutch-section $e^2$ into gear with the section $e$ by allowing the spring $k$ to perform its function, and the mechanism actuated from the shaft E is thrown into action for securing a bundle by the cord, which is tied by mechanism yet to be described.

By referring to Fig. 8 it will be seen that when the parts occupy their inoperative or stationary positions, as there shown, the roller $k^6$ rests against the eccentric-wiper L³ at its extreme point or end most remote from the shaft F², and the long arm of the lever K⁵ is rocked inward by its spring to the extent of its movement in such direction, or until arrested by the stop-lug $k^7$ bearing upon the under side of the link-arm $K^3$, near the pivot of the lever. In this position the roller-carrying arm of the elbow-lever and the link-arm $K^3$, by their thrust against the wiper $L^3$, hold the shifter-lever K in position to prevent engagement of the clutch-coupling sections. Upon the actuation, as above explained, of the vibrating arm $L'$ by the gavel-arrester, and the consequent vibration of the elbow-lever against the strain of its spring, the roller $k^6$ is rocked upward free of the wiper and the clutch-coupling sections $e\ e^2$ become engaged to cause the rotation of the shaft E. After the roller $k^6$ gets above the wiper $L^3$ the spring $K^6$, acting on the lower arm of the elbow-lever, swings it inward to the normal position, thus adjusting the parts for the action of the wiper $L^3$ upon the shifter-lever K upon the completion of a revolution of the shaft $F^2$, and so throwing the shaft E out of operation when it has made a single revolution. As will readily be understood, the roller-carrying arm of the elbow-lever, when in the position shown by Fig. 8, becomes, practically considered, a rigid prolongation of the reciprocating link-arm $K^3$, so that the shifter-lever K cannot be vibrated to release the sliding clutch-section so long as the wiper $L^3$ bears against the roller $k^6$. Shortly after the vibration of the elbow-lever by the looped link-bar L and the starting into motion of the shaft $F^2$ the wiper $L^4$ on this shaft acts against the roller or lateral stud of the thrust-arm $L^5$, and through its connections with the gavel arresting, s'zing, and compressing arm $D^3$ gives to this arm a slight positive movement against the bundle to compress it and enable the tying mechanism to take cord out of the band for forming the knot. After the arm $D^3$ has been elevated to release a bundle by the action of the binder-arm actuating-crank, as before explained, it again falls into position to check the incoming grain, and the wiper $L^3$ stops in position to dog the link-arm $K^3$ by bearing against the roller $k^6$ of the vibrating elbow-lever $K^5$. Upon the downward movement of the binder-arm a bundle discharger or pusher, M, bears upon a bundle in event of its hanging and forces it downward until it bears on the ground or is caught by the stubble and left as the machine advances. The pusher is shown as formed by a pivoted fork-ended rod, jointed at m by its shank or upper end to a downwardly-projecting rod fastened to the binder-arm and its cam-grooved plate. The pusher is free to swing back and forth, or in a plane parallel with the path of the machine, so as to free the bundle and prevent breakage in event of forcible resistance to the direct movement of the pusher.

The intermittingly-operated tyer-actuating shaft F, thrown into and out of operation by the driving-shaft E, as before explained, has given to it one complete turn or a single revolution at each actuation. This shaft F, by means such as next to be described, controls devices for clamping the cord as presented by the binder-arm, for adjusting the two ends of a band, for looping and knotting the band ends, and for severing the cord to release that portion of it forming the band about a bundle, and so allow of the discharge of the bundle.

A rotary cam carrier or disk, $M'$, provided on its under face with a series of cam-tracks, is secured to the lower end of the shaft F, beneath the front inner end of the binding-table or grain-receptacle portion $D'$ of the platform $A^2$. (See Figs. 11, 12, 14, and 16.) This cam-carrier is covered and protected by a suitable casing, and the lower end of the shaft F is mounted in a bearing in the forward end of the base-plate $M^2$ of this casing, so as to turn freely. The position in which the cam-carrier is shown by the figures above referred to is that occupied by it shortly after having commenced to revolve and at a time when the binder-arm G has completed its descent and projected into the slot $m'$ of the tyer-casing. By the continued movement of the cam-carrier it acts by a cam track or rib, N, and an auxiliary cam-rib, $n$, upon a roller, $m^2$, passing up through a slot in the cam-carrier and secured to the heel or inner end of an arm, $M^3$, jointed at its outer end by a pivot, $m^3$, with the lower one, $m^4$, of a pair of cord-directors. The upper one, $M^4$, of these two vibrating cord placers or directors is fastened to the upper end of an oscillating shaft, $m^5$, to the lower end of which shaft the other cord-director, $m^4$, is fixed at its heel and near its pivotal connection with the endwise-moving actuating-arm $M^3$. The oscillatory movement of the shaft given it by the reciprocation of the arm or link $M^3$ is thus caused to operate the two cord-placers simultaneously. The outward stroke or thrusting movement of the link $M^3$ is imparted to it by the cam-track $n$ and the heel of the track N, while the inward or return stroke of this link-arm to complete a reciprocation and return the cord-placers to their resting or normal positions is imparted by the track N while acting at or near its front end on the roller $m^2$. It should be noticed that after this roller has been passed by the heel end of the main cam-track N, the reciprocating arm $M^3$, before its return or inner stroke, remains stationary for a while during the action of the auxiliary cam $n$, and with the cord-directors at the extreme of their movement, and that after the instroke of this reciprocating arm there is also a pause in the movement of these cord-placers during the time the portion of the cam N which is concentric with the driving-shaft F is acting upon the roller $m^2$. The arm $M^3$, in addition to actuating the cord-placers, is made to act upon a reciprocating skeleton carrier-frame or yoke-slide, O, for actuating a cutter, $O'$, and a sliding carrier, $O^2$, of a rotating and reciprocating swinging cord-hook, $o$. To impart to the reciprocating arm $M^3$ the function of operating the slide O by moving it inward, this arm is provided on its under side with a lug, $o'$, which, on the inward stroke of the arm, abuts against a bracket, $o^2$, fast on the slide O. As will be seen by referring to Figs. 11 to 15, inclusive, one arm of an angle-plate constituting the bracket $o^2$ is fastened to one side or yoke-arm of the slide O' above the base $M^2$, while the lower arm or horizontal projection of the bracket crosses beneath the arm $M^3$, so as to be engaged by the lug $o'$ to retract the slide after it has been thrust outward by an edge cam or series of projections or inclines, $o^3$ $o^4$ $o^5$, on the periphery of the cam-carrier M'. This edge cam acts by its inclines successively, at short intervals, upon the inclined or rounded inner end, $O^3$, of the slide, the leading cam-projection, $o^3$, striking the slide at about or immediately after the time the auxiliary cam $n$ begins to act on the roller $m^2$. The knot is tied in a band, as presently to be described, while the cord-placers are at the extreme of the movement imparted to them by the outward stroke or thrust of the arm $M^3$ and while the edge cam is acting on the slide O, from the incline $o^4$ to the completion of the thrust imparted to the slide by the incline $o^5$. The cord is cut by the final action of the incline $o^5$ upon the cutter O', which, as plainly shown by Fig. 12, is pivoted at the heel end to a fixed cutting-blade, $O^4$, and linked at its outer end to an arm, $o^6$, of the slide O.

The main clamp or inner member of the reciprocating cord griping or holding devices is formed by a slide-bar, P, which at its outer end co-operates with the adjacent or inner end of an outer griper-bar or sliding clamp, Q. A strong spring, Q', acts upon the heel end of this outer member of the clamp with a tendency to move this clamp-section inward or toward the main clamp-section P, and to hold it in its inward position when it has reached the limit of its stroke in such direction.

Referring to Figs. 11 to 14, inclusive, and detail views 37 to 44, inclusive, the various positions of the clamps during the bundling and tying operations will be understood by the aid of the following description: The slide-bar P has a roller, $p$, mounted upon the inner or heel end of its shank or arm P', and this roller is acted upon by the cams N $n$ of the cam-carrier M' in the same way that the roller $m^2$ is acted upon, as before explained. In this way the outward or thrusting stroke is given to the clamp-bar P, and through it to the clamp-section Q, against the pressure of the spring Q', by the abutting of the bar P against a shoulder, $q$, at the side of the bar Q. The return or inward stroke of the clamp-bar P is in part given it by the cam N and is in part imparted by the spring Q'. It should be noticed that the contact-surfaces or points of contact of the clamp-slides P and Q are at the tops and near the sides or edges of these bars, next the point of the binder-arm G, when in the cord-slot $q'$. The cord passes to the clamps by way of the rounded guiding-edge of the shoulder $q$ of the clamp-slide Q. More remote from the binder-arm than the top cord-clamp formed by the slide-shoulder $q$ and end of the slide P there is a lower or auxiliary clamp, formed by an inner fixed member or stationary plate, R, beneath the bar P, and by attachments to the inner end of the clamp-slide Q, beneath the plane of its shoulder $q$. The clamp-bar P is supported on the plate R, and reciprocates in a suitable guideway in the base-plate $M^2$. The end of the clamp-plate R is formed with a slot or recess, $r$, as best shown in Figs. 38 and 42. A horn, $Q^2$, forming a cord stop or arrester for the band end operated upon by the lower cord-placer, $m^4$, works endwise in this slot $r$ when the clamp-slide Q, to which it is fixed, reciprocates. A shorter horn or nose, $q^2$, on the slide Q, also projects into this recess $r$ when the slide is moved inward to arrest the cord in position for engagement by the upper clamp. When the slide Q is retracted or moved outward the nose $q^2$ passes out from the slot $r$, and the cord may then be directed past this nose into position to be held by the lower clamp, or between the end of the plate R (against the top and bottom walls of its slot $r$) and the end of the slide-bar Q, intermediate the horn $Q^2$ and nose $q^2$. The horn $Q^2$ abuts at its point against a stop, shown as formed by the inner termination or end wall of the slot $r$, to limit the inward movement of the slide Q when the slide P is retracted, and so leave a space between the shoulder $q$ and the plate R for the cord to enter to the upper clamp and at such time be arrested by the edge of the projecting lower clamping portion of this slide at or near the base of the nose $q^2$. When the cord is held by the lower clamp it serves to limit the inward movement of the clamp-slide Q, the horn $Q^2$ at such time being arrested just short of abutting against the stop. In Fig. 39 the end of the cord is shown as held in the lower clamp, as it would be left after securing a bundle and severing the cord, (see Fig. 44,) and the lower cord-placer, $m^4$, is represented in section as in a position occupied by it after having been started in operation to direct the cord from the binder-arm to the cord-holders to be engaged first by the upper clamp.

By referring to Figs. 2 and 10 it will be seen that the binder-arm is provided with notches $s\ s$, so that the cord-placers $M^4\ m^4$ may engage the cord in the groove therein. In the positions occupied by the parts as shown in Figs. 37 and 38 the cord-placers have been vibrated to the extent of their movement, leaving the cord in position to be nipped by the upper clamp. Figs. 40, 41, 42, and 43 illustrate how the cord passes to the lower clamp by the corresponding action of the lower placing-finger, $m^4$, and suitable tension devices acting on the cord passing from the binder-arm, the cord from the binder-arm being in this way drawn into place inside the nose $q^2$ to be clamped. At this time the two ends of the band are held by the upper clamp, and the cord is not released until the lower clamp has taken its hold on the cord. In Fig. 44 the end of the binder-arm portion of the cord is shown as clamped. When so held the band portion of the cord is severed to release a bound bundle, ready for a repetition of the binding operations. As shown by the latter figure, there is a short length of cord cut off at the end clamped at the beginning of the operation. These waste ends drop out of the clamps, their discharge being facilitated by the peculiar form of the top portion of the clamping end of the slide Q, which is cut away and inclined, as at $q^3$, inside of its shoulder $q$, so that the incoming cord is enabled to push the waste end out of the way and to a position where it will not be caught by the upper clamp or interfere with the griping action.

The tying mechanism or cord looping and knotting devices are in part actuated by means of a slide-bar, $P^2$, and its heel-roller $p'$, operated upon by a cam-track, $R'$ $r'$ $r^2$, and an auxiliary cam-ledge, $R^2$, on the cam-carrier $M'$. The slide-bar $P^2$ has two upwardly-projecting lugs, $p^2$ $p^2$, formed upon or secured to its outer end. These lugs engage an annular sliding collar or disk, $P^3$, upon a rotary tubular ended spindle or cord-looping mandrel, $P^4$, supported at or near its opposite ends in bearings in two brackets, $p^3$ $p^4$, which are secured to the base-plate $M^2$ by means of posts $p^5$ $p^5$ $p^6$ $p^6$. These posts form a guideway for the reciprocating yoke or sliding carrier-frame O, above which the mandrel-bearings are located. A rotary and reciprocating cord-engaging hook, S, is supported by its shank in the outer tubular end of the mandrel $P^4$. (See Fig. 17.) This inner or sheathed hook of the knotter is connected at the heel end of the shank with the hub of the collar $P^3$ by a cross-pin, $s'$. This pin passes through the hook-shank and collar-hub and plays in a slot, $s^2$, in the mandrel as the collar reciprocates to impart the requisite endwise movement to the inside hook. By this pin-and-slot connection between the sliding collar, the hook, and the non-reciprocating rotating mandrel, the hook is caused to turn with the mandrel, while allowed to reciprocate without interference. The thrust or outward movement of the sheathed hook is given by means of a spring, $S'$, encircling the mandrel and bearing at its opposite ends against the hub of the collar $P^3$ and against a fixed collar, $s^3$, on the mandrel. (See Figs. 3, 11, and 14.) The return movement or instroke of this hook is imparted by means of the slide-bar $P^2$, actuated by the cam-carrier, as will be understood by reference to Figs. 12, 14, and 15.

The outer or vibrating, reciprocating, and rotating cord engaging and looping hook, $o$, of the knotter has its turning movements imparted to it by the mandrel, and is reciprocated with the sliding carrier-frame O.

The sliding head or carrier $O^2$ of the outside hook is mounted upon the squared or polygonal portion $S^2$ of the mandrel $P^4$, as clearly shown in Fig. 18, and is thus compelled to turn with, while left free to slide upon, the mandrel. A recessed or vertically-lugged bracket, T, on the outer end of the sliding frame O engages with an annular groove, $t$, in the hook-carrying head $O^2$, and thus reciprocates this head. A longitudinal and radial slot, $T'$, is formed in the head $O^2$, as shown by Figs. 17 and 18, and the hook $o$ is pivoted in this slot by a pin, $t'$. A spring, $t^2$, is secured at its heel end to the sliding head, and bears at its free end upon the heel of the hook, with a tendency to rock its opposite end, or the hook proper, outward or away from the mandrel, and to keep the hook-heel against the mandrel or in contact with a tripper or hook-actuating incline, $T^2$, thereon. The inner surface or edge of the hook is recessed or doubly inclined, as clearly shown, to enable it to be operated by the incline $T^2$ and spring $t^2$ to rock the hook away from and toward and against the mandrel. The rotary movements of the mandrel are imparted in such way as to cause it to turn in one direction somewhat more than a complete revolution, (about a revolution and a half,) and then to turn in the reverse direction, making, say, half a revolution, and stopping in a position corresponding to that occupied by it when first acted on. During the time the mandrel is being oscillated or turned first one way and then the other the cord is looped, tied, and severed and the knot cast off from the mandrel. The mandrel is in this instance given its rotations from the shaft F and its cam-carrier $M'$ by mechanism now to be described, and as shown by Figs. 3, 11, 14, and 16.

A pinion, U, from which one tooth is omitted, so as to form a space, $u$, between two of the teeth nearly three times the size of that between any other adjacent teeth, is fastened to the inner end of the mandrel $P^4$ where it overhangs the cam-carrier. A sector-rack or curved bar, $U'$, toothed upon its under side, is fastened to the shaft F and cam-carrier. This rack has spaces $u^2$ between each of its end teeth and the respectively adjacent teeth corresponding to the space $u$ in the pinion, and is so enabled to readily and properly engage and leave the pinion without necessitating a very nice adjustment of parts.

A pin, $v$, Figs. 11, 14, and 16, is fixed to the mandrel near its inner bearing, and so as to rest or bear upon the top surface of the cam carrier or disk $M'$, and near its periphery, to prevent accidental turning of the mandrel in one direction when not actuated by the rack $U'$. The peripheral or edge cams of the cam-carrier are below the plane of the upper surface of the cam-disk, upon which the controller or stop-pin $v$ bears, and the edge of this disk is recessed or cut away at V and $V'$, as shown in Fig. 11 and indicated by the dotted lines, Fig. 12. When the sector-rack engages the mandrel-pinion the controller-pin (which had previously borne upon the cam-disk between the recess $V'$ and front end of the recess V, so as to prevent movement of the mandrel in the direction imparted to it by the rack) works in the recess V, thus allowing the mandrel to be turned and leaving the pin projecting about in the direction shown by dotted lines in Fig. 16. The continued movement of the cam-carrier next causes a stud, $v'$, thereon to strike the pinion U to give the reverse turn to the mandrel and rock the pin $v$ down into the recess V', by the action of which, in connection with the stud $v'$, the mandrel is set or its pinion U brought to the inoperative or starting position, in which it remains until the rack U' again acts. In this position the stop-pin $v$ dogs the mandrel against rotation in one direction, as above explained, while accidental turning of the mandrel in the opposite direction is prevented by a stop-lug, $w$, and a spring or vertically-yielding stop-arm, W, against the outer end of which this lug bears. When the mandrel is rotated by the sector-rack this stop-arm yields, when the lug $w$ rides up against its under side, and after that passes by the stop-arm the continued movement of the mandrel in the direction given it by the sector carries this lug round far enough to allow of the back turn of the mandrel being given it to bring the lug against the stop-arm.

During operation it will readily be understood by inspection of Fig. 2 that the binder-arm G remains stationary for a short time when in its extreme downward position, and so enables the vibrating cord-placers $M^4$ $m^4$ and co-operating devices to operate properly. This pause in the movement of the binder-arm occurs when the roller $h$ of the crank H is at and near its lowermost point, at which time the curved portion of the camway H' of the binder-arm is brought into position concentric with the shaft $F^2$ of the actuating-crank H, so that this roller can move in the camway without affecting the position of the binder-arm.

Figure 19:
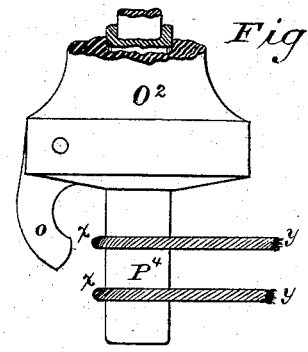
Figure 20:
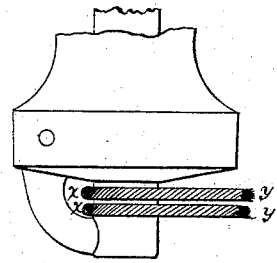
Figure 22:
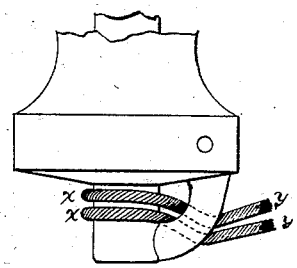
Figure 21:
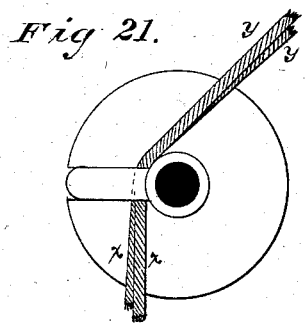
Figure 23:
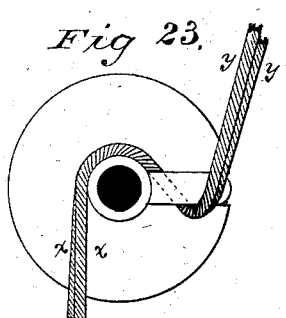
Figure 24:
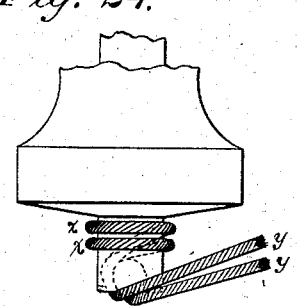
Figure 26:
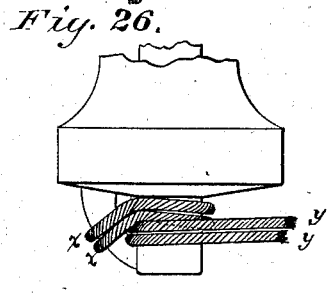
Figure 28:
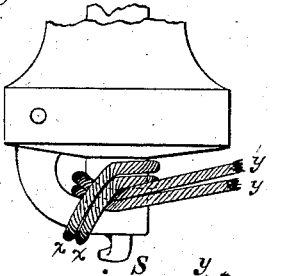
Figure 25:
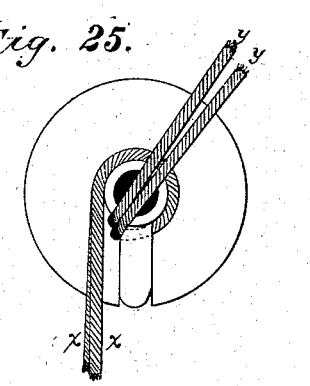
Figure 27:
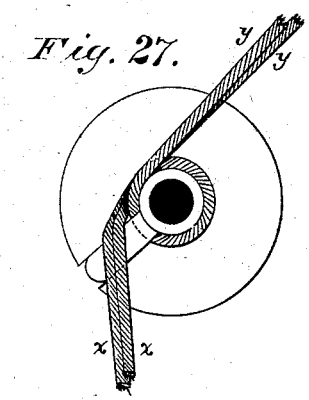
Figure 29:
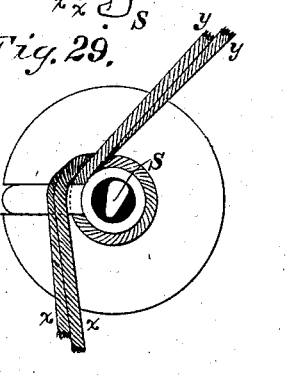
Figure 30:
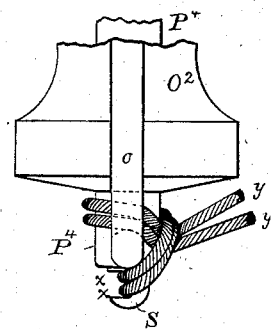
Figure 32:
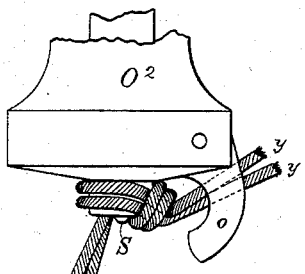
Figure 34:
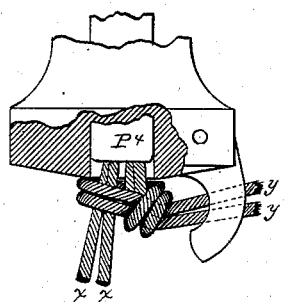
Figure 31:
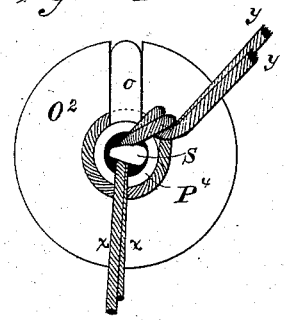
Figure 33:
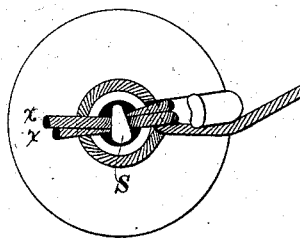

By the aid of Figs. 19 to 36 the operations of the cord-hooks and mandrel will be understood to be as follows: The end of the cord being held, the bundle accumulated, the binder arm caused to descend, and the cord directors or placers and clamps actuated as already explained, the cord is presented to or pressed against the mandrel and held partly around it, as shown in Fig. 19. The hook $o$ next moves outward with its sliding head and swings against the mandrel, as shown by Figs. 20 and 21, outside of the point about which the cord is held and subsequently wrapped or looped. While the hook is closed against the mandrel it prevents displacement of the cord. By the rotation of the mandrel and outer hook the cord is wound and looped about them, the various stages of this winding and looping operation in the process of knotting being represented by Figs. 22 to 29. In these and in the other figures beginning with the diagram 19 and ending with diagram 35 the extreme or clamped ends of the cord for a band are indicated by the letters $x$ $x$, while the letters $y$ $y$ indicate parts of the cord inside the knot or forming the band. By the time the stage in the knotting operation which is represented by Figs. 28 and 29 is reached it will be seen that the inside hook, S, has been advanced beyond the end of the mandrel, and by the time this projected inner hook has been turned into the position to engage the loop formed about the outer hook this latter hook has assumed the position shown by Figs. 30 and 31, to release its loop, which is drawn into the mandrel by the return-stroke of the inner hook as the outer hook-carrier moves outward to cast off the cord. (See Figs. 32, 33, and 34.) That portion of the cord wound about the mandrel forms an outer loop, which is cast off by the outward movement of the sliding head $O^2$ and the vibration of the hook $o$. The inner loop is drawn through the outer one and the knot completed and free to clear itself of the hook S' by the time the revolution in one direction of the mandrel and hooks is completed, as shown in Fig. 35. In the position of the parts shown by this figure the sliding head of the outer hook has been moved in far enough to close this hook down upon the mandrel. After this, and upon the finishing part of the instroke of the sliding head $O^2$, the reverse turn is given to the mandrel to restore it to its starting or resting position. At about the stage in the tying operation represented in Figs. 32 and 33 the cord is severed and its end left clamped in the lower clamp, as already fully explained.

To provide for accumulating the grain into a compact bundle and so facilitate binding, two guard-arms or grain-holders, Y Y, (or one only of such guards, if desired,) are provided, as shown in Figs. 45 and 46. Each arm is suitably pivoted at one end to the frame-work so as to vibrate vertically, in this instance by the bracket Z, and at its opposite end the arm is bent upward to form the grain guard or holder proper, Y', by which injurious rolling or scattering of the grain after being collected by the gatherer $D^2$ is prevented. The grain being drawn in by the gatherer acts upon the inclined arms or shanks of the guards and elevates them, as will readily be understood from inspection of Fig. 45. As soon as the grain has been drawn inward past an arm, Y, this arm drops by gravity upon the binding-table, behind the grain, and by abutting against the grain prevents the spreading or separation of the stalks when freed by the gavel-gatherer.

I claim as of my own invention—

1. The combination of the platform, the grain-delivering apparatus thereof, the gavel-evener, the pivot passing through its base near its outer end, and means by which the evener is vibrated to cause its vertical portion to repeatedly strike the butts of the grain, substantially as and for the purpose hereinbefore set forth.

2. The combination of the platform, the grain-delivering bands or chains, the binding-table, the vibrating gavel-evener, and the pair of driven pulleys, by connections with which the grain-delivering chains and gavel-evener are actuated, substantially as and for the purpose hereinbefore set forth.

3. The combination, substantially as hereinbefore set forth, of the binding-table, the vibrating gavel-evener, to which the butts of the grain are presented as passing to the binding-table, the pitman connected to said evener, the link-rod, the elbow-lever connecting said pitman and link-rod, the driven pulley, and its crank connected to the link-rod, for the purpose described.

4. The combination of the driving-chain B³, the shaft C², the pair of connected loosely-mounted pulleys thereon, the chain C', the shaft C, driven thereby for actuating the platform grain-delivering apparatus, the pulley-crank, and the vibrating gavel-evener actuated thereby, substantially as and for the purpose hereinbefore set forth.

5. The combination, substantially as hereinbefore set forth, of the platform, the grain-delivering apparatus, the binding-table, the gavel-gatherer, its pivoted and jointed or elongating and contracting shank, the rotating crank plate or cam by which the gatherer is lifted and dropped, and the controller-arm or link-rod connecting the crank-plate and gatherer-shank, and by which the gatherer is moved outward while elevated by the action of the cam-plate and drawn inward after it is dropped.

6. The combination of the reciprocating rising and falling gavel-gatherer, the intermittently-rotating actuating-shaft, the cam-shaped crank-plate, and the guide or lifter arm of the gatherer, substantially as and for the purpose hereinbefore set forth.

7. The combination, substantially as hereinbefore set forth, of the cam-shaped crank-plate, the shaft by the rotation of which the crank-plate is actuated, the reciprocating rising and falling gatherer operated by the crank-plate, the loosely-mounted constantly-rotating pulley on the actuating shaft, and the clutch-coupling connection between said pulley and shaft to throw the gatherer out of operation upon the descent of the binder-arm.

8. The combination of the gavel-gatherer, the shaft by the rotation of which the gatherer is operated, the clutch-coupling for throwing the shaft into and out of operation, the lever acting on the clutch-coupling and by which its two members are normally held in gear, the controlling-rod engaged by said lever, and the binder-arm acting upon the controlling-rod to throw the clutch out of gear and intermit the operation of the gatherer, substantially as hereinbefore set forth.

9. The combination of the grain-delivering apparatus, the gavel-gatherer, the gavel-evener, and the driven pulley, by connections with which said delivering apparatus, gatherer, and evener are actuated, substantially as and for the purpose hereinbefore set forth.

10. The combination, substantially as hereinbefore set forth, of the reciprocating binder-arm, the reciprocating pivoted gavel-arrester or stop-arm against which the grain is compressed, its spring acting with a tendency to hold it in its lowermost position and against movement by the pressure of the grain, the arm or link actuated by the swing of the arrester to throw the bundle-securing mechanism into operation, the crank on the binder-arm actuating-shaft, and mechanism actuated by said crank to lift the arrester upon the ascent of the binder-arm, for the purpose described.

11. The combination, substantially as hereinbefore set forth, of the binding-table, the gavel-gatherer, the vibrating and reciprocating gavel-arrester, between which and said gatherer the grain is accumulated and compressed, bundle-securing mechanism thrown into operation by the swing of the arrester when a sufficient quantity of grain has been gathered to form a gavel, the rotating shaft, its crank, and mechanism connected with the arrester and actuated by said crank to elevate the arrester and free a bundle.

12. The combination, substantially as hereinbefore set forth, of the swinging gavel-arrester, the vibrating arm to which it is pivoted, and the vertically-reciprocating bar to which said vibrating arm is linked, for the purpose described.

13. The combination of the swinging gavel-arrester, the vibrating arm to which it is pivoted, the vertically-reciprocating bar, the link connecting it with the vibrating arm, the stud on the reciprocating bar, and the roller on the crank of the binder-arm actuating-shaft, substantially as and for the purpose hereinbefore set forth.

14. The combination, substantially as hereinbefore set forth, of the reciprocating binder-arm, its actuating-shaft, the camway or slot of the binder-arm, the crank of the actuating-shaft, its pin or roller passing through said camway, and the vertically-reciprocating gavel-arrester, actuated by said roller upon the ascent of the binder-arm, for the purpose described.

15. The combination of the vertically-reciprocating binder-arm and the swinging pusher pivoted thereto, to insure the discharge of a bound bundle upon the descent of the binder-arm, substantially as hereinbefore set forth.

16. The combination of the vertically-reciprocating vibrating gavel-arrester, the reciprocating arm, in the slot or link of which the arrester works to move it in one direction to throw the binding mechanism into operation, and by the positive movement of which arm in the opposite direction the arrester is caused to forcibly compress the gavel, substantially as and for the purpose hereinbefore set forth.

17. The combination of the vibrating gavel-arrester, the reciprocating arm in the slot or link of which the arrester works, the vibrating arm to which this reciprocating arm is pivoted, the thrust-arm pivoted to said vibrating arm, the stud or roller on the thrust-arm, and the wiper on the binder-arm actuating-shaft, substantially as and for the purpose hereinbefore set forth.

18. The combination of the vertically-reciprocating binder-arm, the cranked actuating-shaft thereof, the tyer-actuating shaft, the intermittently-revolving driving-shaft E, by which said actuating-shafts are thrown into operation, the constantly-rotating loosely-mounted pulley or chain-wheel on said driving-shaft, the clutch-coupling connection between the pulley and shaft, the clutch-shifter by which the clutch-sections are normally held apart, the vibrating gavel-arrester, mechanism connecting it with the clutch-shifter and by the actuation of which the binder-arm and tyer are thrown into action, the roller on the crank of the binder-arm actuating-shaft, and mechanism connected with the arrester and acted upon by said roller upon the ascent of the binder-arm, substantially as and for the purpose hereinbefore set forth.

19. The combination of the driving-shaft E, the binder-arm actuating-shaft geared therewith, the clutch-coupling on said driving-shaft, the clutch-shifter, the reciprocating bar pivoted to the clutch-shifter, the vertically-vibrating elbow-lever pivoted to said bar, its spring, the link-connection between the downwardly-projecting arm of the elbow-lever and a vibrating arm actuated by the gavel-arrester, and the wiper-cam on the binder-arm actuating-shaft operating upon a roller carried by the horizontally-projecting arm of the elbow-lever, substantially as and for the purpose hereinbefore set forth.

20. The combination of the cord-clamps, the two vibrating cord-placers, their reciprocating actuating-arm, and the oscillating shaft, to the opposite ends of which the cord-placers are respectively fixed, substantially as and for the purpose hereinbefore set forth.

21. The combination of the cam-carrier, its cams N $n$, the arm N³, its roller, the oscillating shaft to which said arm is pivoted, and the cord-placers carried by said shaft, substantially as hereinbefore set forth.

22. The combination, substantially as hereinbefore set forth, of the cam-carrier, the reciprocating actuating-arm M³, the cutter, and the slide or reciprocating carrier-frame to which the cutter is pivoted.

23. The combination of the reciprocating arm M³, the pivoted cord-placers vibrated thereby, the reciprocating carrier-frame, the bracket thereon, and the lug on said reciprocating arm, substantially as hereinbefore set forth.

24. The combination of the reciprocating carrier-frame, the cam-carrier, by the direct action of which it is moved in one direction, the arm M³, acted upon by the cam-carrier and serving to move the carrier-frame in the opposite direction, and the cutter, substantially as and for the purpose hereinbefore set forth.

25. The combination of the binder-arm, the vibrating cord-placers, and the upper and lower cord-clamps, arranged in different vertical planes, and above and below which the cord-placers work to direct the band ends first to the upper clamp and subsequently place the end of the cord in the lower clamp, substantially as and for the purpose hereinbefore set forth.

26. The combination, substantially as hereinbefore set forth, of the binder-arm, the cord-placers, the upper cord-clamp, by which the band ends are held while being looped by the tyer, the lower cord-clamp, by which the end of the cord passing direct to the binder-arm is held, and the cutter for severing the cord forming the band after the end of the binder-arm cord is nipped by the lower clamp and before the release of the band ends by the upper clamp.

27. The combination, substantially as hereinbefore set forth, of the binder-arm, the upper cord-clamp, knotting mechanism acting on the cord while the band ends are held by said clamp, and the lower cord-clamp, to which the end of the cord passing to the binder-arm is directed before the completion of the knot, and by which the end of the cord is nipped before the release of the band ends, for the purpose described.

28. The combination, substantially as hereinbefore set forth, of the reciprocating inner slide-bar or main section of the cord-clamp, the griper-bar or outer sliding section thereof, provided with upper and lower clamping-surfaces in different vertical planes, and the spring acting upon said griper-bar, for the purpose described.

29. The combination of the cord clamp main slide, the griper-bar or outer clamp-slide, the shoulder thereon, between which and the main slide the cord is nipped, and the cord-arresting nose of said outer slide, substantially as and for the purpose hereinbefore set forth.

30. The combination of the inner clamp-section or slide-bar, the spring-actuated griper-bar or outer section of the clamp, and the stationary clamp-plate, these members being and operating substantially as hereinbefore set forth.

31. The combination of the outer clamp-slide or griper-bar, the stationary plate, slotted at its end, and the lower clamping projection of said griper-bar, provided with the horn and nose, substantially as and for the purpose hereinbefore set forth.

32. The combination, substantially as hereinbefore set forth, of the clamp-slide or main section, its arm or shank, the cam-carrier, the griper-bar provided with two clamping-surfaces, the spring bearing on the griper-bar, and the clamp-plate or stationary clamping-surface, for the purpose described.

33. The reciprocating griper-bar Q, provided with the shoulder $q$, the horn Q², and the incline $q^3$, substantially as and for the purpose hereinbefore set forth.

34. The combination, substantially as hereinbefore set forth, of the rotating non-reciprocating mandrel, the sliding vibrating cord-engaging outer hook rotating with said mandrel, mechanism for imparting the sliding and vibratory movements to said hook, and means whereby the mandrel and hook are turned first in one direction and then in the other to form the loops in the band ends, as described.

35. The combination, substantially as hereinbefore set forth, of the mandrel, turning first one way and then the other, against which the band ends are pressed and upon which the cord is wound to form the outer loop of the knot, the vibrating reciprocating outer hook rotating with said mandrel, and by which the inner loop of the knot is formed, the reciprocating inner hook rotating with the mandrel, and means whereby said hook is caused to engage the inner loop to draw tight the knot, as described.

36. The combination of the rotating mandrel, the vibrating outer hook, its carrier or sliding head, by which it is reciprocated upon the mandrel and caused to rotate therewith first one way and then the other, and the inner hook, rotating with the mandrel and reciprocating therein to draw one loop through the other as cast off, substantially as and for the purpose hereinbefore set forth.

37. The combination of the mandrel, to which is first imparted a movement of rotation in one direction and then a partial reverse turn, the reciprocating hook-carrier or sliding head turning with the mandrel, the vibrating hook, and the incline acting thereon to rock the hook, to allow the loop formed in the cord about the mandrel to be cast off by the sliding head, substantially as hereinbefore set forth.

38. The combination of the rotating mandrel turning in both directions, the reciprocating inner hook rotating therewith, the reciprocating vibrating outer hook, also turning with the mandrel, the head sliding on the mandrel to cast off the cord, the cord-placer, by which the cord is directed to and pressed against the mandrel, cord-clamping mechanism, and the cutter to sever the band ends and enable the inner hook to draw the knot tight, substantially as hereinbefore set forth.

39. The combination of the cord-looping mandrel, the pinion thereon, the sector-rack, the recessed cam-carrier, and the stop-pin on the mandrel, substantially as and for the purpose hereinbefore set forth.

40. The combination of the cord-looping mandrel, the pinion thereon, the cam-carrier, and the stud thereon operating on the pinion to give the reverse turn to the mandrel, substantially as hereinbefore set forth.

41. The combination of the mandrel, the cam-carrier, the sector-rack, the mandrel-pinion, the stop-pin on the mandrel, the stud on the cam-carrier, the stop-lug on the mandrel, and the yielding stop-arm acting thereon, substantially as and for the purpose hereinbefore set forth.

42. The combination of the cord-looping mandrel, the outer cord-engaging hook rotating therewith, the hook carrying head sliding on the mandrel, the reciprocating carrier-frame, and the bracket thereon engaging the hook-carrying head, substantially as and for the purpose hereinbefore set forth.

43. The combination of the tubular-ended non-reciprocating mandrel, the cam-carrier, mechanism actuated thereby for turning the mandrel first one way and then the other, the reciprocating cord-engaging hook, sheathed in the mandrel and rotating therewith, the spring acting on the hook to move it in one direction, and the slide-bar, actuated by the cam-carrier and serving to move the hook in the opposite direction, substantially as and for the purpose hereinbefore set forth.

44. The combination of the reciprocating carrier-frame, its guideway, the rotating non-reciprocating cord looping mandrel supported in bearings above the carrier-frame, the cam-carrier acting on said frame to move it outward, the slide-bar actuated by the cam-carrier to retract said frame, mechanism actuated by the cam-carrier for turning the mandrel first one way and then the other, the sliding vibrating outer hook rotating with the mandrel, the reciprocating inner hook, also rotating with the mandrel, the thrust-spring acting on the inner hook, the slide-bar of said hook actuated by the cam-carrier, and the bracket on the carrier-frame acting on the outer hook, for the purpose described.

45. The combination of the binding-table, mechanism by which the grain is accumulated thereon, the grain-arrester or stop-arm against which the grain is gathered, and the grain-holder (or holders) lifted by the upward pressure of the grain as drawn inward toward and against the arrester, and falling into position behind the gathered grain, for the purpose described.

In testimony whereof I have hereunto subscribed my name.

WILLIAM LOTTRIDGE.

Witnesses:
 HERMAN MINIGER,
 FRANK MINIGER.